United States Patent [19]

Hartel et al.

[11] Patent Number: 5,385,007
[45] Date of Patent: Jan. 31, 1995

[54] POT-SPINNING DEVICE HAVING MAGNETIC BEARING PROVIDING RADIAL AND AXIAL SUPPORT

[75] Inventors: Robert Hartel, Aachen; Karl-Josef Brockmanns, Willich, both of Germany

[73] Assignee: W. Schlafhorst AG & Co., Moenchengladbach, Germany

[21] Appl. No.: 31,613

[22] Filed: Mar. 15, 1993

[30] Foreign Application Priority Data

Mar. 13, 1992 [DE] Germany .................. 4208039

[51] Int. Cl.⁶ .................. D01H 7/74; D01H 1/08
[52] U.S. Cl. .................. 57/76; 57/77; 57/264; 57/312; 57/349; 310/90.5
[58] Field of Search .............. 57/58.76, 75, 76, 312, 57/77, 349, 124, 264, 100; 310/90.5

[56] References Cited

U.S. PATENT DOCUMENTS

| | | | |
|---|---|---|---|
| 3,314,223 | 4/1967 | Bobkowiez | 57/76 |
| 3,851,448 | 12/1974 | Sano et al. | 57/124 X |
| 4,022,008 | 5/1977 | Pimiskern et al. | 57/100 |
| 4,080,779 | 3/1978 | Freeman et al. | 57/160 |
| 4,920,290 | 4/1990 | Murakami et al. | 310/90.5 |
| 5,009,063 | 4/1991 | Yamaguchi et al. | 57/75 X |
| 5,117,448 | 5/1992 | Benato et al. | 310/90.5 X |
| 5,197,270 | 3/1993 | Stahlecker | 310/90.5 X |
| 5,216,308 | 6/1993 | Meeks | 310/90.5 |

FOREIGN PATENT DOCUMENTS

| | | |
|---|---|---|
| 288924 | 3/1971 | Austria . |
| 0082548 | 6/1983 | European Pat. Off. . |
| 504615 | 9/1992 | European Pat. Off. .......... 57/76 |
| 71.11442 | 10/1972 | France . |
| 1447376 | 12/1968 | Germany . |
| 2154983 | 5/1972 | Germany . |
| 2457783 | 6/1976 | Germany . |
| 2537597 | 3/1977 | Germany . |
| 3011415C2 | 2/1985 | Germany . |
| 4103369A1 | 9/1991 | Germany . |
| 58-37317 | 3/1983 | Japan . |

OTHER PUBLICATIONS

Dipl.-Ing. F. Schumann, Ingolstadt, "Konstruieren fur eine neue Textiltechnologie-gezeigt am Beispiel der OE Garnerzeugung", Chemiefasern/Textilindustrie, Sep. 1981. No translation.

*Primary Examiner*—Daniel P. Stodola
*Assistant Examiner*—William Stryjewski
*Attorney, Agent, or Firm*—Shefte, Pinckney & Sawyer

[57] ABSTRACT

A pot spinning device is disclosed for spinning textile yarn in which the spinning pot has an inner wall and the pot is driven by a magnetic bearing device for rotating the spinning pot. The magnetic bearing device provides radial and axial support of the pot. The magnetic bearing device may comprise at least one electromagnet disposed at each end of the spinning pot. At least the ends of the spinning pot may be formed of a magnetic material positioned to interact with the magnetic bearing device. The magnetic material may be formed as an annularly magnetic portion at each end. At least one sensor may be connected to the magnetic bearing device for detecting a displacement of the spinning pot. The magnetic bearing device may have a control device for stabilizing the position of the spinning pot against displacement due to exterior forces. The spinning pot may comprise a rotor of the electric motor. The electric motor may include an annular rotor on the spinning pot. The device for rotating may be an electric motor having a short circuit rotor and a stator. The rotor may be formed of an electrically conducted material surrounding the spinning pot in the area of the stator and wherein the spinning pot may comprise a non-metallic material, with metallic material at the ends.

16 Claims, 3 Drawing Sheets

POT-SPINNING DEVICE HAVING MAGNETIC BEARING PROVIDING RADIAL AND AXIAL SUPPORT

BACKGROUND OF THE INVENTION

The invention relates to a pot-spinning device of the type in which yarn guided from a guide positioned within a spinning pot is wound in layers onto the inner wall of the spinning pot as a spinning cake and, more particularly to bearings for supporting the spinning pot.

In conventional pot-spinning, yarn is deposited in a plurality of wound layers as a spinning cake on the inner wall of the pot by means of relative reciprocation of the pot and a central yarn guide disposed concentrically within the pot. The pot is usually driven by a belt, similar to the belt drive of spindles of ring-spinning machines. Pots of this type are typically supported for rotation in roller or ball bearings. The capability of pot-spinning devices is limited by bearing and driving technology. A pot-spinning device of the conventional type is known from Austrian Patent AT PS 288 924, for example. The seating of the pot in this application is effected with deep-groove ball bearings instead of roller bearings, and the drive of the pot and the lifting device for the yarn guide is effected by means of belts. Additionally, U.S. Pat. No. 4,022,008 which is expressly incorporated herein by reference, discloses a pot-spinning device.

Known bearing techniques in pot spinning, such as the roller bearing technique have productivity limits defined by the speed value capabilities of the bearings. The speed value is the product of the speed and the diameter of the bearing. The limits for the speed value are mostly predetermined by the rolls or balls of the bearings being capable of operating at the centrifugal force generated by high rotational speeds.

Thus, a bearing system for spinning pots at higher speed productivity than conventional bearing systems is desired.

SUMMARY OF THE INVENTION

An object of the present invention is to improve the bearing and driving techniques to increase the speeds and therefore the productivity of pot-spinning devices.

This and other objects of the present invention are accomplished with a pot-spinning device for spinning textile yarn, in which the spinning pot has an inner wall and the pot is driven by a device for rotating the spinning pot. A yarn guide is positioned within the spinning pot for winding yarn on the wall of the spinning pot. A magnetic bearing device which may comprise a plurality of magnetic bearings supports the spinning pot on a frame.

Preferably, the magnetic bearing device may include two magnetic bearings positioned at upper and lower ends of the pot and may provide radial and axial support of the pot.

The magnetic bearing device may comprise at least one electromagnet disposed at each end of the spinning pot but preferably concentrically around each end, and at least the ends of the spinning pot are formed of a magnetic material positioned to interact with the magnetic bearing device. The magnetic material may comprise an annularly magnetic portion at each end.

At least one sensor may be connected to the magnetic bearing device for detecting a displacement of the spinning pot. The magnetic bearing device may form at least one magnetic field and the at least one sensor may comprise at least one induction coil, through which flows at least one magnetic field of the magnetic bearing device.

The magnetic bearing device may have a control device for stabilizing the position of the spinning pot against displacement due to exterior forces. The control device for stabilizing the spinning pot comprises means for exerting counteracting forces on said at least one magnetic field.

The device for rotating may be an electric motor. The spinning pot may comprise a rotor of the electric motor. The electric motor may include an annular rotor on the spinning pot. The device for rotating may be an electric motor and the electric motor is disposed between the magnetic bearing device.

The spinning pot may comprise a short-circuit rotor of said electric motor and the electric motor may be a rotary current motor. The spinning pot may comprise a magnetic material. The device for rotating may be an electric motor having a short circuit rotor and a stator. The rotor may be formed of an electrically conductive material surrounding the spinning pot in the area of the stator and wherein the spinning pot may comprise a non-metallic material, with magnetic material at the ends.

DESCRIPTION OF THE PREFERRED EMBODIMENTS

Figure 1:
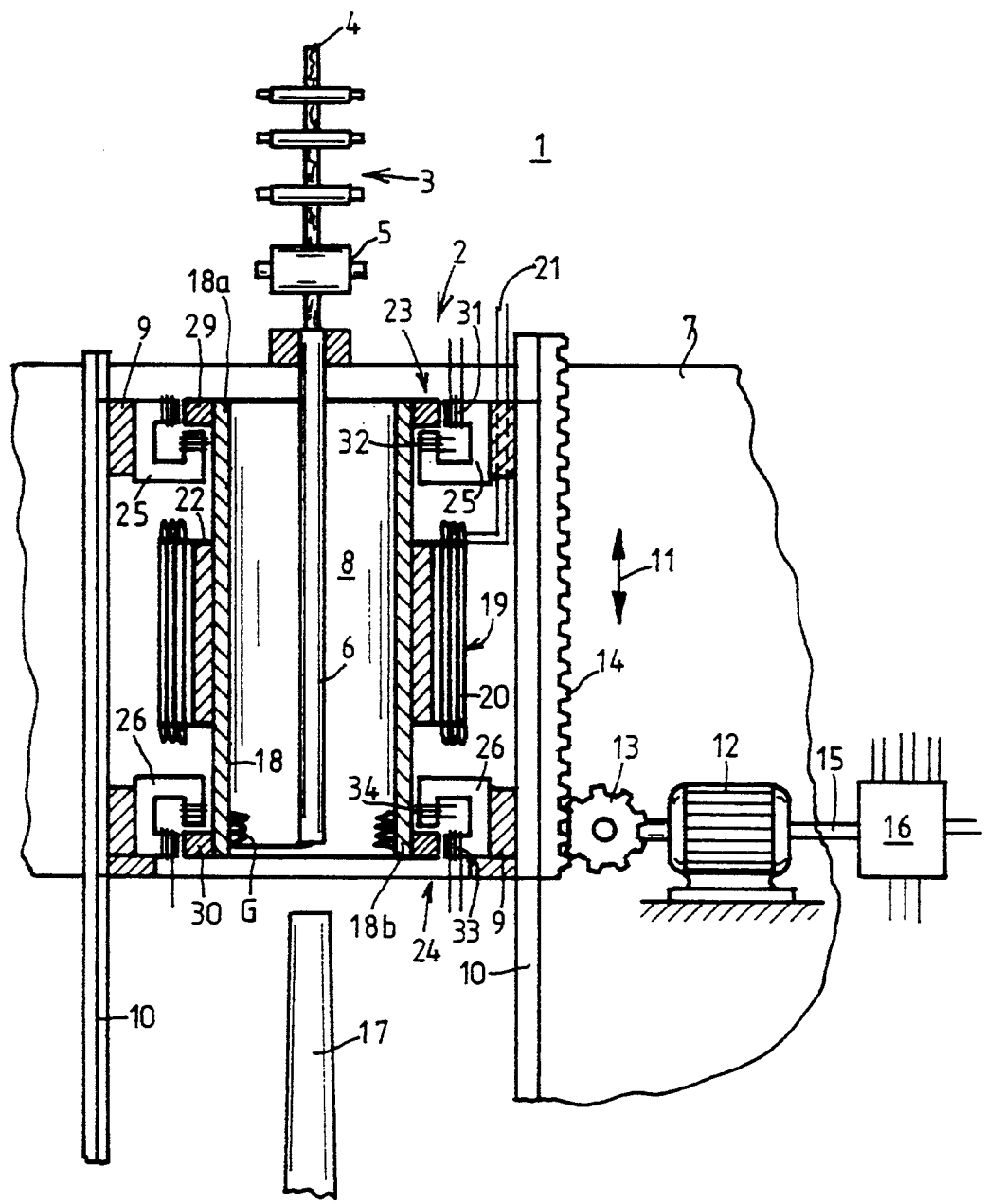
FIG. 1 is a vertical section of a portion of a spinning station incorporating a pot-spinning device according to the preferred embodiment of the present the invention.

FIG. 1 shows one of a plurality of pot-spinning stations 1 having pot-spinning devices 2. Only the features that are necessary for comprehending the invention are represented and explained, the other details being understood from conventional pot-spinning technology.

A spinning machine with pot-spinning devices typically includes a plurality of spinning stations in sequence. In the present case only one spinning station is taken as an exemplary embodiment. At the spinning station a sliver 4 is drafted by a series of drafting rollers 3. The sliver can be delivered from coiler cans or speed frame bobbins, which are not shown here. The drawn sliver 4 is supplied from a drawbox 5 to the spinning station 1, into a yarn guide 6. The yarn guide in the present exemplary embodiment is secured so as to be stationary on the frame 7 of the pot-spinning device. It protrudes centrally into the spinning pot 8 at the center axis of the spinning pot 8. The yarn guide 6 can be a pipe or a guide eyelet made of wire, for example.

The spinning pots can be seated individually, as shown in the present exemplary embodiment, so that each spinning pot 8 can be driven individually, independently of the adjacent spinning pots, not only for rotational movement, but also for reciprocal movement for the formation of the spinning cake. Alternatively, the series of spinning pots may be disposed on a supporting device for simultaneous vertical reciprocation to form the wound yarn cake.

The spinning pot 8 is fixed on a supporting device 9, that is vertically movably mounted on the frame 7 and is guided for movement in vertical groove guides 10 formed in the frame 7. The guides lying in the plane of the observer have been omitted for clarity.

The reciprocal movement of the pot to form the spinning cake supporting device 9 is accomplished with the help of a motor 12, that drives a pinion 13 engaging a toothed rack 14 that is secured vertically to the supporting device 9 in the area of the right groove guide 10. The motor 12 is connected to a control device 16, with which the reciprocating movements of the supporting device 9 and therefore the spinning pot 8 are controlled, by the control line 15. The movements of the supporting device 9 may also be executed with other devices, such as, for example with hydraulic or pneumatic cylinders, instead of with a toothed rack and a pinion.

FIG. 1 shows the supporting device 9 with the spinning pot 8 in its upper end position. The formation of a spinning cake has just begun, and a few yarn layers G have already been deposited on the inner wall of the spinning pot 8.

The supporting device 9 can be lowered after formation of the spinning cake for transfer of the cake onto an aligned yarn carrier 17, shown only schematically here, for transport to other equipment for rewinding of the yarn.

In the present exemplary embodiment, the spinning pot 8 is a thin-walled cylinder 18 of a non-metallic material driven for rotation by an electric motor 19. The motor 19 includes a stator 20 disposed concentrically around the cylinder 18 of the spinning pot and secured on the supporting device 9. A metal ring 22 is disposed concentrically on the circumference of the cylinder 18. It can be made of aluminum, for example, and acts as a short-circuit rotor of the rotary current motor. Electrical supply and control of the motor are effected by means of the lines 21, which are connected to the control device 16.

The spinning pot 8 may be seated on its upper and lower ends in magnetic bearings 23 and 24, with the rotary current motor 19 disposed between the two. The magnetic bearings 23 and 24 are each disposed concentrically around the upper end 18a and the lower end 18b, respectively, of the cylinder 18 of the spinning pot 8, and comprise upper and lower cores 25 and 26, which are preferably iron and which are wound with coils 31,32,33,34 for generating the magnetic field necessary for supporting of the spinning pot 8.

Figure 2:
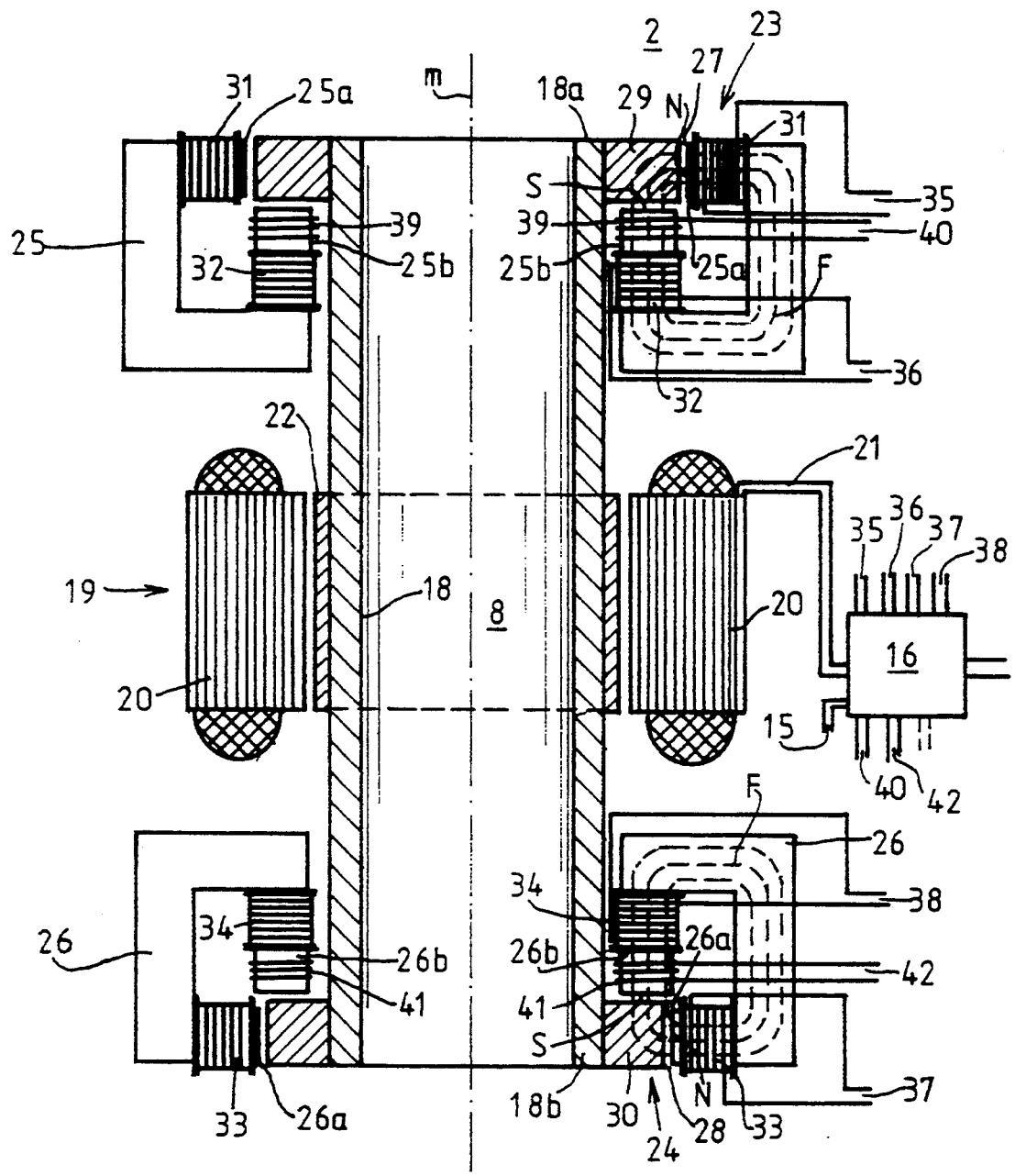
FIG. 2 is an enlarged view of the magnetic bearings and the electric motor drive portions of the pot-spinning device of FIG. 1.
Figure 3:
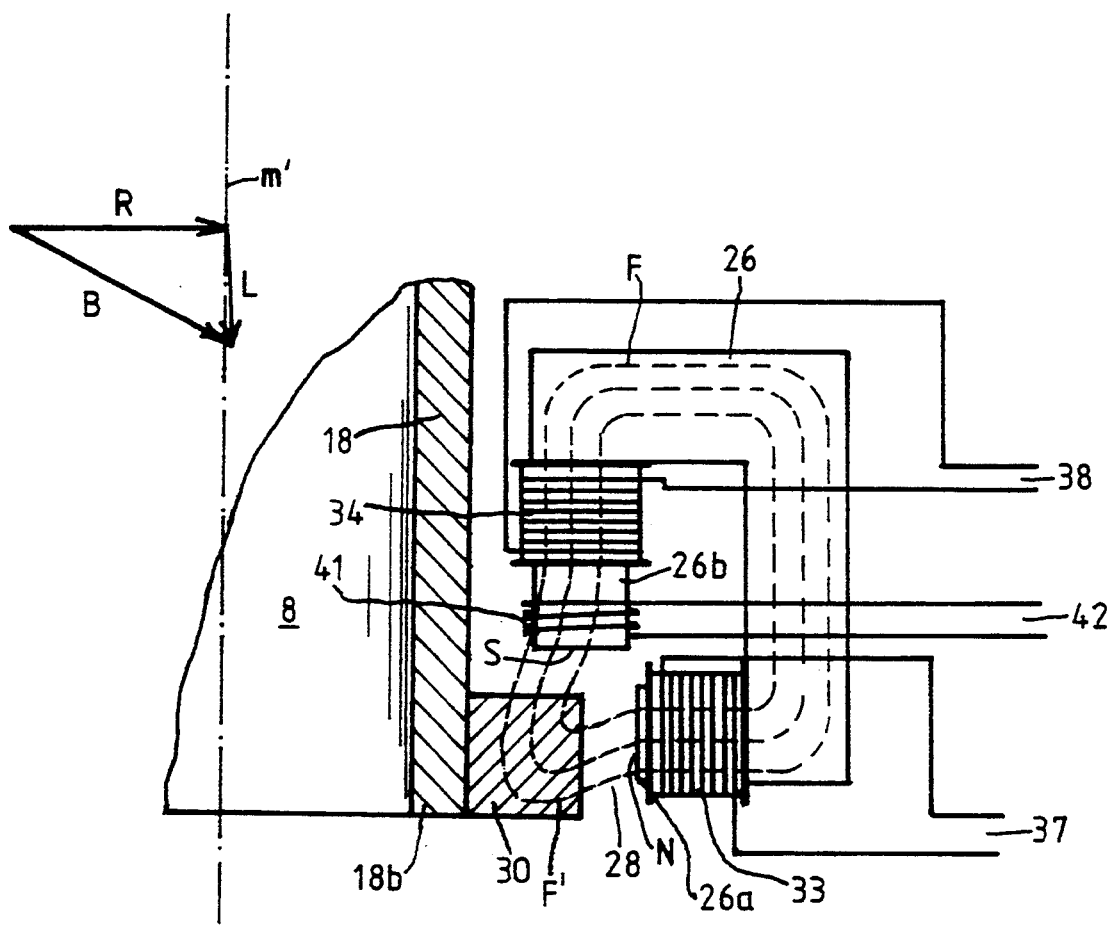
FIG. 3 is a further enlarged view of one bearing and illustrates the condition when the position of the spinning pot is displaced from its normal position.

The design of the magnetic bearing means is illustrated in enlarged form in FIGS. 2 and 3. The cores 25 and 26 of the magnetic bearings have a hollow rectangular shape with one corner open adjacent the end of the pot cylinder 18 to form a magnetic gap 27,28. Rings 29 and 30, which are preferably soft-iron, are disposed concentrically around the outside of the upper end 18a and the lower end 18b, respectively, of the cylinder 18 of the spinning pot 8 and are secured to it. These rings 29 and 30 extend into the gaps 27 and 28, respectively, to be positioned in the magnetic flux created by the iron cores 25,26, with the rings 29,30 spaced out of physical contact with the cores 25,26.

The upper cores 25 are formed with horizontally facing legs 25a, which are radially opposite the soft-iron ring 29 on the cylinder 18 and have the coils 31 wound thereon. The cores 25 also have virtually upwardly facing legs 25b axially parallel to the cylinder 18 of the spinning pot 8 and have the coils 32 wound thereon. Similarly, the lower iron cores 26 have horizontally facing legs 26a radially opposite the iron ring 30 at the lower end 18b of the cylinder 18 with the coils 33 wound thereon, and vertically downwardly facing legs 26b with the coils 34 wound thereon.

Each magnetic bearing 23 and 24 for the spinning pot 8 can be constructed with a single annular iron core 25 or 26 that surrounds the spinning pot 8 concentrically, with the legs 25a, 25b, 26a and 26b, extending therefrom. The magnetic bearings can, however, also be constructed from individual segments for each set of legs 25a,25b and 26a,26b. Dividing a magnetic bearing into sections in this way offers a particularly good option for controlling the magnetic forces for optimum support of the spinning pot, even under alternating axial or radial loads.

The coils 31,32 on the legs 25a,25b, respectively, which are disposed opposite each other at right angles, are each wound and penetrated by the current such that they each form an oppositely polarized magnetic field. Coils 33,34 and legs 26a,26b are structured similarly. The coils 31,32 on the legs 25a,25b, for example, can be polarized such that north poles N lie on the faces of the radial legs 25a and south poles S lie on the faces of parallel legs 26b. Similarly, the legs 26a or 26b are polarized such that a north pole N lies on the faces of the radial legs 26a and south poles S lie on the faces of the parallel legs 26b. The soft-iron rings 29 and 30 on each end 18a and 18b of the cylinder of the spinning pot 8 close the paths for the magnetic fields of the iron cores 25 and 26, respectively. These rings 29 and 30 bundle the lines of magnetic flux, and assure an optimally closed course of the lines of magnetic flux within the iron cores 25 and 26. The magnetic fields formed in the rings 29 and 30 during current flow through the coils on the iron cores 25 and 26, maintaining the cylinder 18 of the spinning pot 8 in its position.

The windings of the coils are each connected to the control device 16 for current supply. Line 35 connects the coil 31 with the control device 16, line 36 connects coil 32, line 37 connects coil 33, and line 38 connects coil 34. A current flow resulting in an optimum magnetic field can therefore be provided to the individual coils via the control unit 16 in order to stabilize the operation of the spinning pot 8.

Each of the magnetic bearings of the magnetic bearing means may be constructed from permanent magnets. It is advantageous, however, to construct the magnetic bearings from electromagnets. The magnetic bearings preferably comprise at least one electromagnet disposed concentrically around the end of the spinning pot, or, as mentioned, at least the ends of the spinning pot must be formed of a magnetic material. It is not necessary to equip the spinning pot with electromagnets to complete the magnetic bearing system. It is sufficient, for instance, when an iron ring 29,30, disposed concentrically on the ends of the spinning pot, is disposed inside the at least one, annularly arranged electromagnet. The magnetic field of the electromagnet likewise forms a magnetic field in the iron ring, which holds the ring in an exact position due to its concentric design.

The various arrangements of the bearings described wherein the bearings surround the ends of the spinning pot have the advantage that the spinning pot is accessible from both ends of the pot. Access to the spinning cake, for instance when a yarn breaks, is thus possible at every position of the spinning pot or yarn guide.

In a further refinement of the invention, the magnetic bearings are designed to receive radial and axial bearing forces. High positional stability of the spinning pot is another benefit of positioning the magnetic bearings on the ends of the spinning pot. The magnetic bearings are designed in accordance with the invention such that they prevent the radial displacements of the spinning pot that arise due to changing centrifugal forces occurring during formation of the spinning cake. They also prevent axial displacement of the spinning pot during formation of the spinning cake, particularly from the movements resulting from the deposition of the yarn layers as more fully explained below.

When the spinning pot 8 is driven via the motor 19 and the spinning ratios are stable, the spinning pot 8 rotates around its center axis m in a stable manner. The magnetic fields built up by the coils 31, 32, 33 and 34 hold the ends of the rings 29 and 30 in a position that assures an optimum course of the magnetic lines of electric flux. The spinning pot 8 is therefore maintained in a position of equilibrium during its rotation around the axis m.

However, if the spinning pot is brought out of its position of equilibrium because of an imbalance caused by uneven deposition of the yarn layers on the inner walls of the spinning pot 8 or some other imbalance, the lines of magnetic flux are disturbed by the displacement of the rings 29 or 30 occurring when the spinning pot moves off center.

This situation is illustrated in FIG. 3. It shows the lower end 18b of the spinning pot 8, with the spinning pot 8 in a tilted position—exaggerated in the drawing—due to a disturbance, force B, so that its center axis m occupies the position m'. The force B can be broken down into a horizontal vector R, which acts in the radial direction on the spinning pot 8 and thus on the magnetic bearings, and a vertical sector L, which acts in the axial direction on the spinning pot 8 and thus on the magnetic bearings. Consequently the position of the ring 30 around the lower end 18b of the pipe 18 of the spinning pot 8 shifts from its optimum position in the gap 28 in the iron core 26. The gaps between the north pole N and the ring 30 and between the south pole S and the ring 30 change, disturbing the lines of magnetic flux. This disturbance is indicated by the lines of magnetic flux F' forming a magnetic field.

In order to be able to detect such a disturbance of a magnetic field of a magnetic bearing means caused by a load that changes the position of the spinning pot, sensors are provided in accordance with the invention. These sensors are induction coils positioned on a leg of the iron core, which is a magnetic pole. In the present exemplary embodiment an inductive sensor 39 is mounted on the leg 25b of the magnetic bearing 23, in front of the coil 32, and, by a signal line 40, connected to the control device 16. Similarly, the magnetic bearing 24 has a sensor 41 mounted on the leg 26b of the iron core 26, in front of the coil 34, and is likewise connected by its signal line 42 to the control device. The lines of magnetic flux F pass through the inductive sensors 39 and 41.

If the lines of magnetic flux F are not disturbed, a uniform magnetic flux flows through the induction coils 39 and 41, therefore producing a voltage that is constant on the signal lines 40 and 42. If, however, the magnetic field is disturbed, as seen in FIG. 3, the magnetic flux that flows through the coils of the sensors 39 and 41 is altered. Because of this, a voltage that deviates from the previous voltage is immediately induced in the induction coils. This change in voltage, which is induced by the change in the magnetic flux, can act as a signal of a displacement of the spinning pot. From the intensity of the signal. (i.e. magnitude of the change in voltage), the amount and direction of change of the position can be determined.

Sensitivity of the sensors can be greatly increased by dividing the sectors into which each magnetic bearing is placed into smaller sectors and consequently increasing the number of induction coils so that there is a coil for each sector. With the increased number of individual coils, which together form a magnetic bearing and can be triggered individually, disposed around the spinning pot, a magnetic sensor, such as described above, can be located in every sector of each of the magnetic bearings of the magnetic bearing means to increase sensitivity. From the shifting of the spinning pot and from the signals determined thereby, the direction and amount of displacement of the spinning pot can be recorded precisely. The displacement can be immediately counteracted by means of a deliberate change of the appropriate magnetic fields of the magnetic bearings via the control device 16 so that the spinning pot resumes a stable position and the center axis returns from position m' to position m. The evaluation of the sensors can be accomplished with the aid of currently conventional electronic data processing or microprocessors.

In yet another embodiment, instead of mounting soft-iron rings on the ends of the cylinder of the spinning pot as part of the magnetic bearings, the spinning pot itself can also be made of a magnetic material. The magnetic material may, for example, be a cylinder of easily magnetizable soft iron. This soft-iron cylinder simultaneously fulfills all functions that are vital for the electric motor drive and magnetic bearing. This would have the advantage that the cylinder of the spinning pot could simultaneously operate as a short-circuit rotor of the rotor current motor drive, that is, an anchor. In addition, it is possible to use other magnetic materials, such as nickel materials, instead of soft-iron rings. It is also possible to arrange magnets on the spinning pot in such a way that the opposing cylinders on the pipe of the spinning pot 8 are opposite the poles generated by the coils of the magnetic bearings. It is also possible to divide the opposing poles on the spinning pot into sectors, corresponding to a division of the magnetic bearings into sectors around the spinning pot.

However, to keep weight low it is desirable to form the spinning pot of a non-metallic material, such as a plastic. In this case, though, at least the ends in the area of the magnetic bearings must have a magnetic material, such as a soft-iron ring, mounted on them. Here, the part of the spinning pot that lies in the area of the stator of the electric motor drive must have an electrically conductive material, for instance an aluminum sleeve that encompasses the spinning pot of non-metallic material and acts as a short-circuit rotor. Such a spinning pot has a particular weight-saving design.

As mentioned, the electric motor drive of the spinning pot may be designed such that the spinning pot itself is the rotor of the electric motor drive. Here, the stator of an electric motor is disposed around the spinning pot, and the spinning pot is embodied as an anchor. This design is particularly advantageous providing the electric motor drive with a simple and space-saving design. The stator of the electric motor drive can be particularly compact when disposed between two magnetic bearings, which are positioned at the ends of the spinning pot.

To prevent damage to the magnetic bearing means, it must be ensured that, when starting the spinning station, first the magnetic bearing means is turned on, and then the drive of the spinning pot, and when the spinning station is shut down, first the drive of the spinning pot is turned off and then, only after the spinning pot has stopped spinning, the magnetic bearing means is turned off.

As opposed to the conventional bearing techniques, magnetic bearing means have the advantage of having no physical contact between parts, thus having no friction or wear limits the speed of operation. When this bearing technique is used in accordance with the invention for spinning pots, the speed of the pot is independent of the load limits of the bearings. An electric motor drive, most significantly, an individual drive, permits individual control of the speed of a spinning pot at each spinning station, and therefore provides the flexibility to adapt to the specific spinning program and the yarn parameters.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A pot-spinning device for spinning textile yarn, comprising:
   (a) a spinning pot having an inner wall;
   (b) means for rotating said spinning pot;
   (c) a yarn guide positioned within said spinning pot for guiding yarn for winding on said wall of said spinning pot;
   (d) a frame; and
   (e) magnetic bearing means supporting said spinning pot on said frame.

2. A pot-spinning device according to claim 1 wherein said spinning pot has an upper end and a lower end and wherein said magnetic bearing means comprises magnetic bearings disposed adjacent said upper and lower ends.

3. The pot-spinning device according to claim 2 wherein each said magnetic bearing comprises at least one electromagnet disposed adjacent each said end of said spinning pot, and that at least said ends of said spinning pot are formed of a magnetic material positioned to interact with said at least one electromagnet.

4. The pot-spinning device according to claim 3 wherein said magnetic material is formed at said ends of said spinning pot in an annular form.

5. The pot-spinning device according to claim 2 wherein said means for rotating is an electric motor disposed between said upper and lower ends of said spinning pot.

6. The pot-spinning device according to claim 2 wherein said means for rotating is an electric motor having a short circuit rotor and a stator, said rotor formed of an electrically conductive material surrounding said spinning pot adjacent said stator and wherein said spinning pot comprises a non-metallic material with magnetic material at said ends.

7. The pot-spinning device according to claim 1 wherein said magnetic bearing means is disposed to provide radial and axial support of said spinning pot.

8. The pot-spinning device according to claim 1 further comprising at least one sensor connected to said magnetic bearing means for detecting a displacement of said spinning pot.

9. The pot-spinning device according to claim 8, wherein said magnetic bearing means forms at least one magnetic field and said at least one sensor comprises at least one induction coil, through which flow at least one magnetic field of said magnetic bearing means, and said sensor senses variations in said magnetic field resulting from displacement of said spinning pot.

10. The pot-spinning device according to claim 1 wherein said magnetic bearing means has control means for controlling the magnetic field to stabilize the position of said spinning pot against displacement.

11. The pot-spinning device according to claim 1 wherein said means for rotating is an electric motor.

12. The pot-spinning device according to claim 11, wherein said spinning pot comprises a rotor of said electric motor.

13. The pot-spinning device according to claim 11, wherein said electric motor includes an annular rotor on said spinning pot.

14. The pot-spinning device according to claim 11 wherein said spinning pot comprises a short-circuit rotor of said electric motor and that said electric motor is a rotary current motor.

15. The pot-spinning device according to claim 1 wherein said spinning pot is formed of a magnetic material.

16. A pot-spinning device for spinning textile yarn, comprising:
   (a) a spinning pot having an inner wall and upper and lower ends;
   (b) means for rotating said spinning pot;
   (c) a yarn guide positioned within said spinning pot for guiding yarn for winding on said wall of said spinning pot;
   (d) a frame; and
   (e) magnetic bearing means comprising magnetic bearing disposed adjacent said upper and lower ends, and radially and axially supporting said spinning pot on said frame.

* * * * *